United States Patent [19]

Rainville

[11] Patent Number: 4,530,197
[45] Date of Patent: Jul. 23, 1985

[54] THICK CORE SANDWICH STRUCTURES AND METHOD OF FABRICATION THEREOF

[75] Inventor: Gilles Rainville, Northridge, Calif.

[73] Assignee: Rockwell International Corporation, El Segundo, Calif.

[21] Appl. No.: 508,780

[22] Filed: Jun. 29, 1983

[51] Int. Cl.³ .............................................. E04C 2/32
[52] U.S. Cl. ....................................... 52/797; 52/799; 52/695; 228/157
[58] Field of Search ................. 52/694, 695, 635, 799, 52/797; 228/157

[56] References Cited

U.S. PATENT DOCUMENTS

| | | | |
|---|---|---|---|
| 2,141,642 | 12/1938 | Cross | 52/694 |
| 3,019,491 | 2/1962 | Troutner | 52/694 X |
| 3,024,879 | 3/1962 | Kandra | 52/797 X |
| 3,534,463 | 10/1970 | Molin et al. | 52/797 X |
| 3,927,817 | 12/1975 | Hamilton et al. | 228/157 |
| 4,217,397 | 8/1980 | Hayase et al. | 228/157 X |

*Primary Examiner*—Carl D. Friedman
*Attorney, Agent, or Firm*—Charles T. Silberberg

[57] ABSTRACT

A thick metallic sandwich structure having improved strength properties is formed by superplastic forming and selective metallurgical bonding. The structure normally includes at least five sheets (including two face sheets and at least three core sheets), wherein portions of the core sheets are bonded together to form a partially layered core.

22 Claims, 11 Drawing Figures

THICK CORE SANDWICH STRUCTURES AND METHOD OF FABRICATION THEREOF

BACKGROUND OF THE INVENTION

The invention relates to a superplastically formed-metallurgically bonded sandwich structure having an odd number (at least three) of core sheets with portions of the core sheets being layered and unlayered, and a method of fabricating such structures.

It has been known for many years that certain metals, such as titanium and many of its alloys, exhibit superplastic properties. Superplasticity is the capability to develop unusually high tensile elongation with reduced tendency towards necking, within a limited temperature and strain rate range. Aluminum alloys and titanium alloys exhibit good superplastic characteristics.

Diffusion bonding is a metallurgical bonding or joining of similar metallic parts which are pressed together at elevated temperatures and pressures. This causes deformation which results in intimate contact of the surfaces to be joined and subsequent diffusion of the atomic structure. A monolithic metallic piece is formed with joint strength equivalent to that of the parent metal. Diffusion bonding is accomplished entirely in the solid state.

Many of the same alloys used in superplastic forming can also be used in diffusion bonding. When the two processes are combined, the temperatures and pressures for both processes are similar so that the finished product can be formed in what is essentially a one-step operation (see U.S. Pat. No. 3,927,817 to Hamilton, et. al, which is incorporated by reference herein).

However, one disadvantage of this process involves the difficulty in making thicker sandwich structures. Such structures require considerable elongation of the superplastic core materials which may result in a finished product unable to support heavy transverse shear loads, i.e., the wider core spacing needed to accommodate the thicker core sheets may result in a weakened structure.

One reinforced core structure is shown in U.S. Pat. No. 4,217,397 by Hayase, et. al. The structure shown in FIG. 16 of that patent involves a sandwich structure having four sheets (two parallel face sheets, and two core sheets). The two core sheets are diffusion bonded together over their entire length. The core sheets are fusion welded to the face sheets. In order to make this sandwich thicker, the distance between the face nodes and the distance between the face sheets must be increased. This may result in an unstable structure when loads are applied between the face nodes. Also, the core sheets must be of a thicker gauge to support heavier loads which may make the sandwich too heavy for practical use. Another disadvantage of this structure is that the fusion welds provide poor fatigue resistance, and also make the structure difficult to manufacture.

What is required is a thicker, lightweight sandwich structure and a method of making such a structure that overcomes the disadvantages of the prior art. Such a structure would be capable of supporting large transverse shear loads.

SUMMARY

A principal object of the present invention is to provide a method of making a metallic sandwich structure with a partially layered core that is superplastically formed and metallurgically bonded at substantially the same temperature and pressure conditions.

It is another object of the invention to provide a method of making a complex sandwich structure with a partially layered core that has minimal truss eccentricity at the core nodes.

It is another object of the present invention to provide a superplastically formed-metallurgically bonded metallic sandwich structure for applications requiring a thicker and stronger structure to support larger transverse loads.

It is another object of the invention to provide a metallic sandwich structure having only homogeneous bonds, and thereby leaving no large deposits of cast metal at the nodes.

It is yet another object of the invention to provide a superplastically formed-metallurgically bonded sandwich structure that can be readily used in structural components having a broad range of shapes.

Briefly stated the present invention provides a sandwich structure having a partially layered core. The face sheets may be substantially parallel, converging or diverging, substantially concentric, or may have one or more oblique portions.

The core of the sandwich structure includes layered (where two parallel core sheets are bonded together between nodes) and unlayered portions. The core sheets of the structure are selectively joined to the face sheets and to each other. The point at which two or more sheets are joined is referred to as a "node". A "face node" occurs where a face sheet is joined to a core sheet. A "core node" occurs where a core sheet becomes joined to another core sheet. Between immediately successive nodes there is either a layered portion or an unlayered portion. The layered portions are designed for principal support of the face sheets. The unlayered portions support the face sheets at points between layered portion face nodes and also provide transverse support to the layered portions.

Metallurgical bonding, as used herein, includes diffusion bonding, fusion welding, pressure welding, and similar processes. Diffusion bonding involves the solid state joining of metal surfaces by applying sufficient heat and pressure for a time that causes commingling of the molecules at the joint interface. Fusion welding involves the joining of metal surfaces by applying sufficient heat to cause the joint interface to reach the liquid state and merge into a unified whole. Pressure welding involves the joining of metal surfaces by applying pressure to cause commingling of the molecules at the joint interface.

Generally, the core comprises a thick portion and a thin portion. The thick portion consists of core sheets that are bonded together to form layers. The thin portions are unlayered. Since in this embodiment all of the core sheets are the same material and the same gauge, the thick portions are stronger than the thin portions.

The preferred method of metallurgical bonding is diffusion bonding. One reason for this preference is that the bond does not result in an excess of material at the joined interface. Another reason is that the diffusion bonding temperature and pressure ranges, closely match the superplastic forming temperatures and pressures. Hence, the forming process which includes the bonding and the expansion occurs in what is essentially a single step. Hence, the process need only use one heat cycle with the bonding and expansion occurring in the same apparatus.

Diffusion bonding normally involves the treating of selected areas of the core sheets with a maskant prior to positioning said sheets in a stack. The areas where diffusion bonding is to occur are left exposed, whereas the maskant is applied to the remaining surface areas. The maskant may also be applied to face sheets in areas surrounding the face nodes.

The expanded sandwich structure consisting of two face sheets and three core sheets is about 2¼ to 4¼ inches thick. To obtain a thicker sandwich with satisfactory strength properties more core sheets may be used. The angle between the core sheets and the face sheets is in the range of 50 to 65 degrees, and preferably about 60 degrees. If the angle is much greater than 65 degrees, the core sheets will be much closer together in the formed structure. Although this will improve the strength properties, the structure will be considerably heavier. If the angle is less than 50 degrees, the distance between the core sheets in the formed structure will be greater. Although this will result in a much lighter structure, the structure will not be able to support heavier transverse loads.

Other objects and advantages of the invention will become apparent to those skilled in the art upon reading the following detailed description and upon reference to the accompanying drawings.

DETAILED DESCRIPTION OF THE INVENTION

This invention relates to the forming of thick metallic sandwich structures from a plurality of metal sheets having superplastic characteristics. The metallic alloys employed must have a composition and microstructure such that, when heated to a temperature within an appropriate temperature range and when deformed within an appropriate strain rate, they exhibit unusually high tensile elongations with reduced tendency towards necking. Such alloys can be represented by the formula.

$$\sigma = K \dot{\epsilon}^m$$

where
 $\sigma$ = stress
 K = a constant
 $\dot{\epsilon}$ = stress rate, and
 m = strain rate sensitivity Generally if there is no strain hardening, the higher the strain rate sensitivity, the higher will be the tensile elongation prior to rupture. Materials are referred to as superplastic whenever the plot of "m" versus "log$\dot{\epsilon}$" attains a maximum. The minimum m value can be determined by plotting "m" versus total elongation.

The value of "m" is a function of temperature, strain rate, microstructure, and material. Therefore, wide ranges in the value of "m" and the corresponding elongations can be developed for a given material as the rate of deformation changes. It has been found that in superplastic deformation under biaxial stress conditions, the uniformity of thinning is correlated to strain rate sensitivity. For use in the present invention a suitable strain rate is determined and this strain rate is controlled throughout the forming cycle to maintain sufficiently high values of "m" to minimize forming times, and to avoid rupture and excessive localized thinning.

Although many metallic alloys exhibit superplastic properties, the alloys of titanium, such as Ti-6Al-4V, and the alloys of aluminum are preferred. The superplastic temperature range for titanium alloys that is also suitable for diffusion bonding is generally 1450° F. to 1850° F. depending on the specific alloy used.

Figure 1:
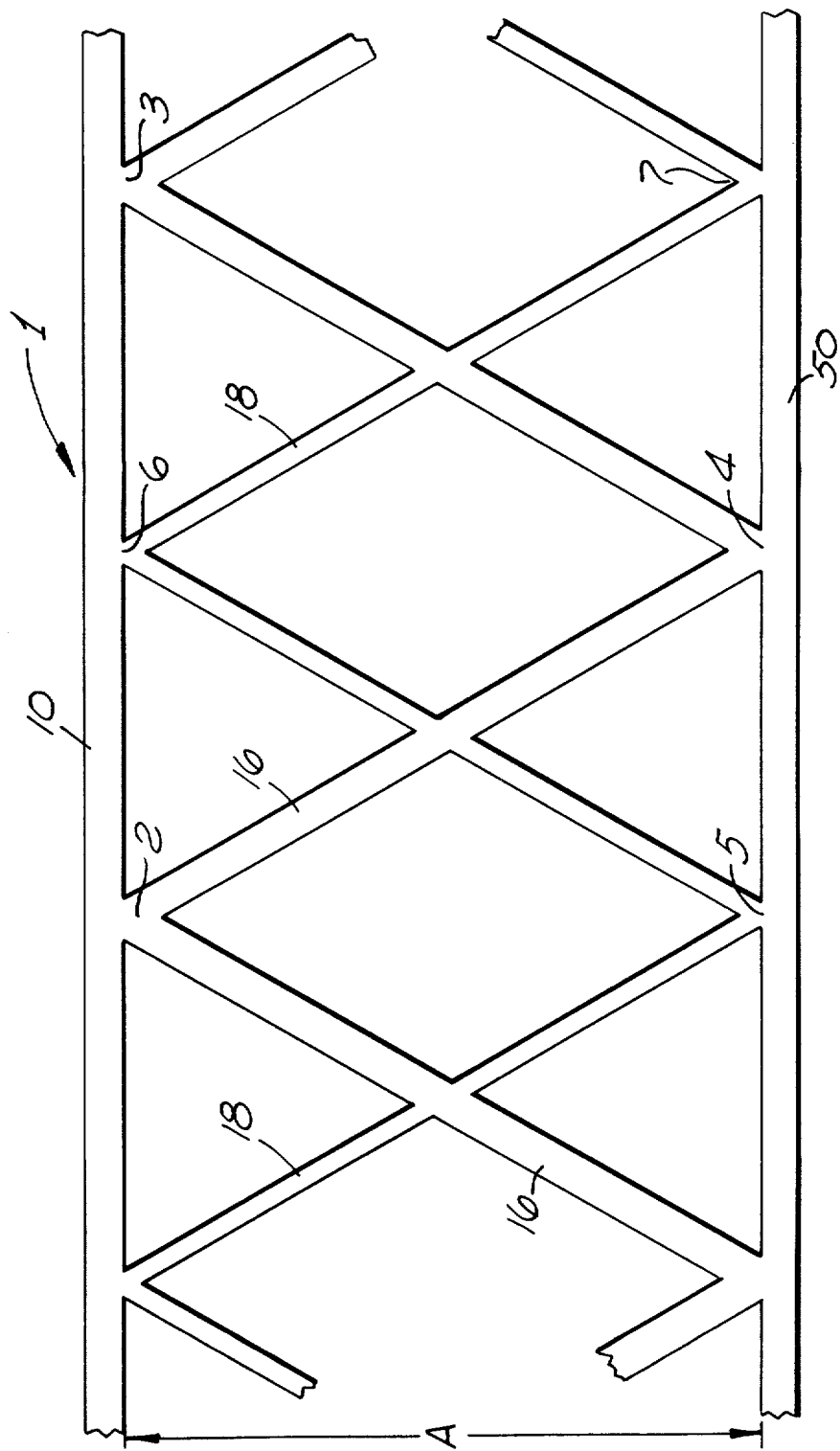
FIG. 1 illustrates an elevational view of an expanded five sheet sandwich structure formed according to the present invention.

FIG. 1 depicts an expanded sandwich structure of the subject invention generally indicated by Arrow 1 having a thick core, indicated by Dimension A. FIGS. 3, 5, 6, 7, 9, and 11 show expanded sandwich structures with lines shown between the expanded bonded sheets. These lines are for purposes of illustration only. The expanded sandwich structure will have no lines between the expanded sheets because the metallurgical bonding will result in a formed homogeneous structure.

The top face sheet 10 and the bottom face sheet 50 surround and sandwich the formed core sheets. The formed core sheets comprise layered core portions 16 that extend from the top face sheet 10 to the bottom face sheet 50 continuously throughout the entire length of the structure with joints at various face nodes 2, 3, and 4. The other core portions 18 are preferably not as thick as the layered core 16. Core portions 18 contact and support face sheets 10 and 50 and also contact and support layered core portions 16. Core potions 18 provide intermediate support to the layered portion face nodes, e.g., at nodes 5, 6, and 7, and additional transverse shear support to structure 1 while minimizing the weight penalty (by virtue of being relatively thin).

Figure 2:
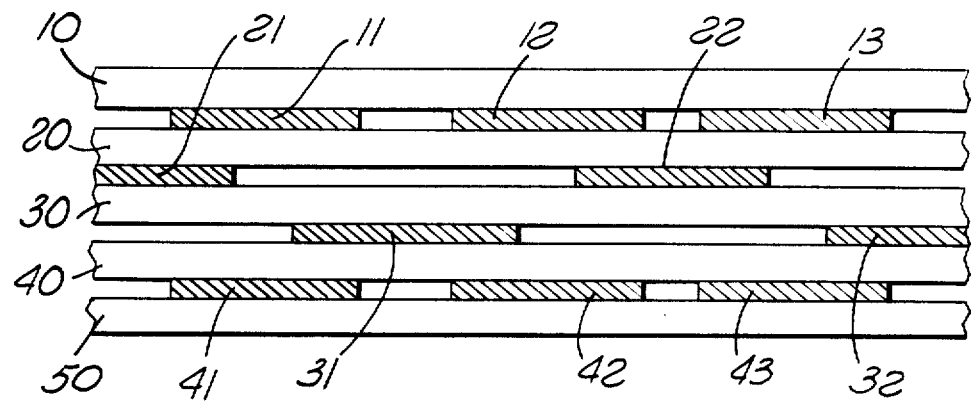
FIG. 2 illustrates an enlarged elevational view of an assembly having five stacked sheets prior to diffusion bonding and superplastic forming.

Referring to FIG. 2, there is shown an assembly having three core sheets 20, 30, and 40, and two face sheets 10 and 50. Diffusion bonding, which is the preferred method of metallurgical bonding, may be practiced in a wide variety of metal alloys, which include aluminum, stainless steel, titanium, nickel, tantalum, molybdenum, zirconium, columbium, and beryllium.

In the present invention only selective portions of the sheets are joined together. A preferred step is to apply a maskant, that is also compatible with the metal sheets, to those areas of the sheets 10, 20, 30, 40, and 50 where no joining is required. The dark portions (e.g., 11, 32, 22, and 43) are the maskant, which is selectively applied prior to assembling the sheets. Examples of suitable maskants are graphite and boron nitride but yttria ($Y_2O_3$), which is applied in a suitable binder by a silk screening process, is preferred.

Both the upper and lower tooling frames (not shown) are shaping members which combine to form the desired shaped structure. When the sandwich structure is diverging, converging, concentric, or has oblique portions, the tooling members must have these overall general shapes.

An inert gas line (not shown) is connected to pressurized inert gas and allows gas to flow through the stack into the upper tooling frame. The inert gas is preferably argon. The gas line can also be connected to a vacuum source for creating a vacuum in the stack. The pressurized inert gas compresses the stack because of the pressure differential between the stack interior and the chamber.

When Ti-6Al-4V metal sheets are used, the stack is heated in an inert gas atmosphere to about 1700° F., and a pressure differential is applied to the stack. When inert gas is used, a pressure differential of up to about 500 psi allows diffusion bonding of the sheets. Depending upon the thickness of the stack, the bonding time may vary from 30 minutes to 12 hours. After the bonding is complete, excess gas is removed from the chamber to allow for inflation of the stack.

Figure 3:
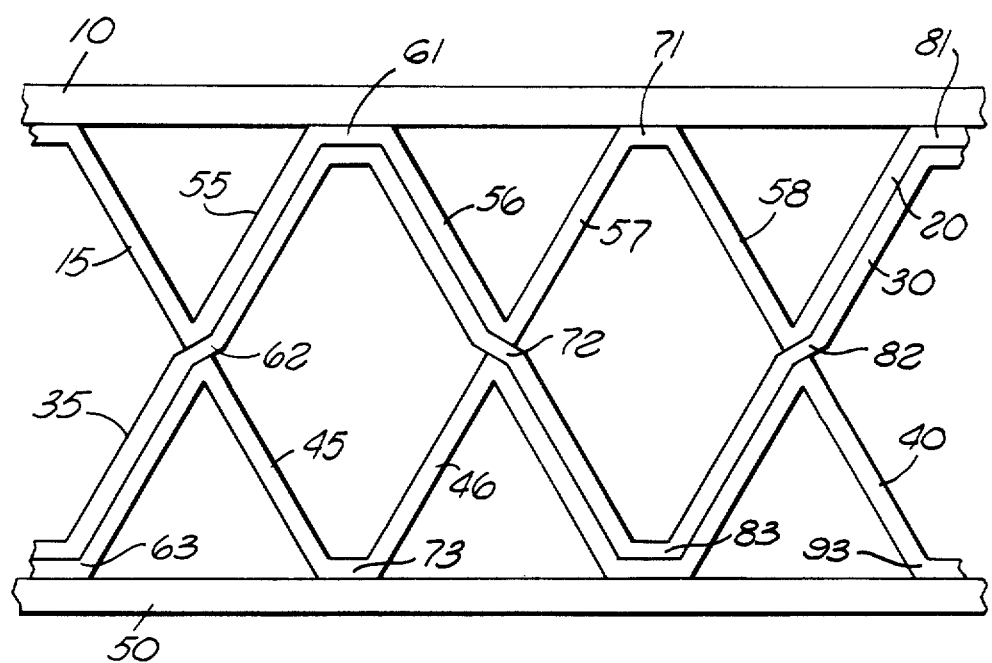
FIG. 3 illustrates an elevational view of the assembly shown in FIG. 2 after diffusion bonding and superplastic forming.

Referring to FIG. 3, the face nodes on the top face sheet are 61, 71, and 81, and the face nodes on the bottom face sheet are 63, 73, 83, and 93. The core nodes are 62, 72, and 82.

One preferred criteria of the invention is to minimize or even eliminate truss eccentricity. Truss eccentricity refers to the amount of deviation from linearity of the core sheets about the core nodes. Hence, eccentricity is eliminated when the core sheets are bonded together to form linear members through the core nodes. For example, core portion 15 and core portion 45 combine to form a substantially straight member through core node 62. Similarly, layered core portion 35 passes through core node 62 to form a substantially straight member with layered core portion 55. This core eccentricity can be eliminated or minimized by precisely controlling the selective application of the maskant, where diffusion bonding is used to join the core sheets 20, 30, and 40, together.

As can be seen in FIG. 3, the maskant must be applied such that (1) center core sheet 30 is selectively bonded to outer core sheets 20 and 40 to form core nodes (where three core sheets are joined) and layered portions (where the center core sheet is joined to only one outer core sheet between immediately succeeding core modes); (2) face nodes along each respective face sheet alternate the joining of layered and unlayered portions, i.e., at face node 61 layered portions 55 and 56 are joined to face sheet 10 while at face node 71 unlayered portions 57 and 58 are joined to face sheet 10; (3) opposite aligned face nodes, e.g., 61 and 73, have alternate joining of layered and unlayered portions, e.g., layered portions 55 and 56 are joined at face node 61 while unlayered portions 45 and 46 are joined at face node 73; and (4) between immediately successive core nodes and face nodes, there is either a layered portion or an unlayered portion, i.e., between core node 62 and face node 61 there is only a layered portion 55 while between core node 62 and face node 73 there is only an unlayered portion 45. With reference to the above, it can be seen that there is alternate bonding of center core sheet 30 to outer core sheets 20 and 40 between core nodes.

Figure 4:
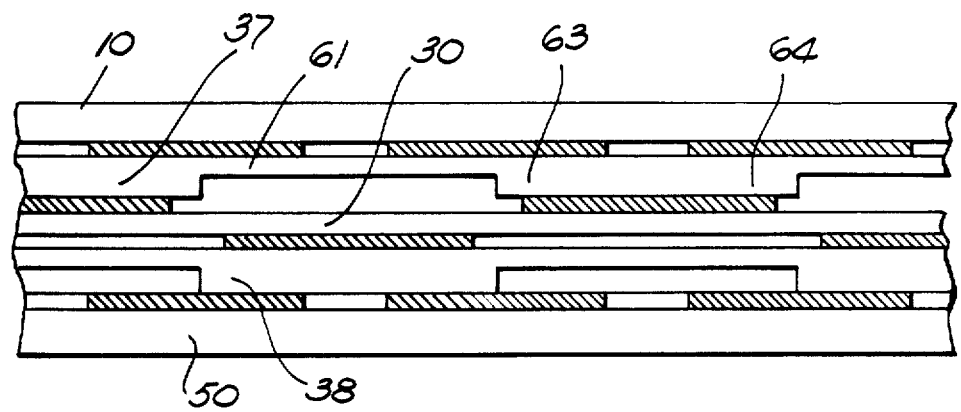
FIG. 4 illustrates an enlarged elevational view of an assembly having five sheets that will form a truss of uniform thickness after diffusion bonding and superplastic forming.
Figure 5:
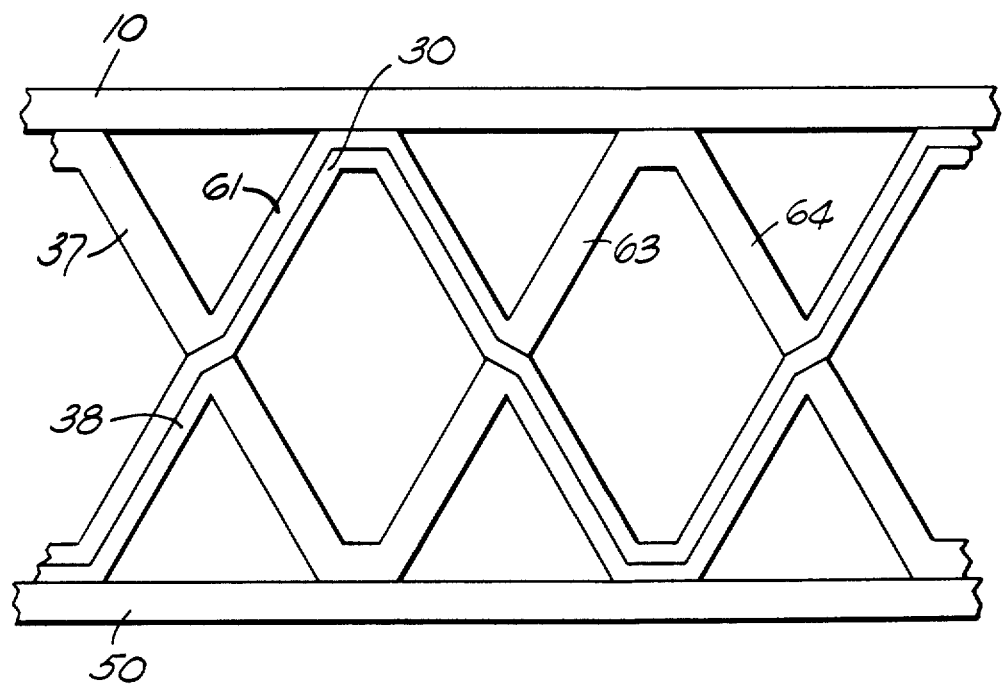
FIG. 5 illustrates the same elevational view shown in FIG. 4 after diffusion and superplastic forming.

Referring to FIG. 5, an enlarged view of a sandwich structure is depicted which has a core of substantially uniform thickness. FIG. 4 depicts how the sheets are to be stacked and the approximate locations of the maskant prior to diffusion bonding and superplastic forming.

To fabricate such a structure, core sheets 37 and 38 are to be selectively processed prior to stacking by chemical milling or some similar process, so that sheets 37 and 38 have thick and thin portions. For example, sheet 37 has thin portions 61 and 62 and thick portions 63 and 64. Sheets 37 and 38 must be thicker prior to processing than core sheet 30 and long strips are chemically milled along the length of sheets 37 and 38 that correspond to the thin portions.

Figure 6:
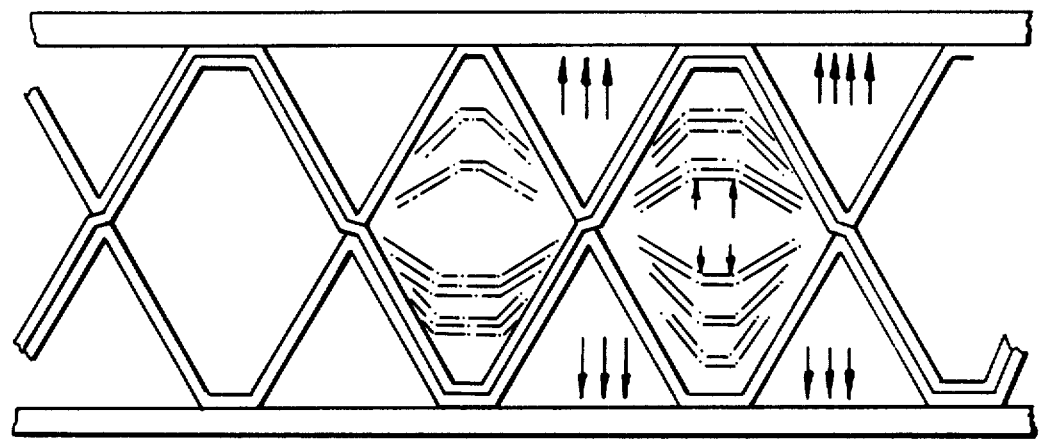
FIG. 6 illustrates the same view shown in FIG. 3 with intermediate partially-formed stages shown in broken lines.

Referring to FIG. 6, the drawing shows in dotted lines the intermediate stages of development as the core sheets are expanded during superplastic forming.

Figure 7:
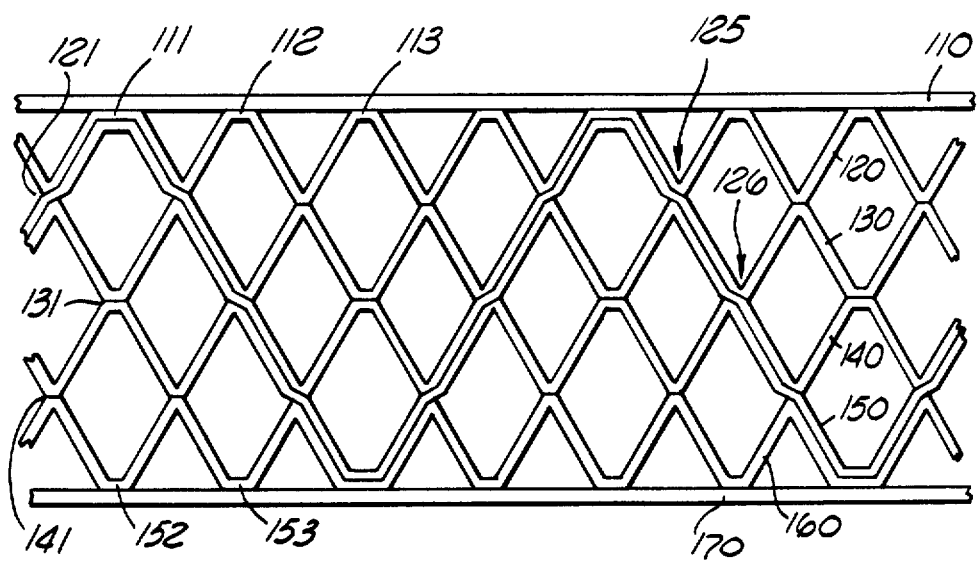
FIG. 7 illustrates an elevational view of a completely formed assembly having seven sheets.

Referring to FIG. 7, a seven sheet finished structure is shown having two face sheets 110, and 170, and having five core sheets 120, 130, 140, 150, and 160. Examples of core nodes are shown at 121 (three-sheet), 131 (two-sheet), and 141 (two-sheet). Some face nodes are shown at 111, 112, 113, 152, and 153. The layered portions run continuously between the two face sheets 110 and 170. The layered portions consist of two sheets metallurgically bonded together, but at each core node one of the two sheets becomes an unlayered portion and is replaced by another core sheet. For example, above core node 125, core sheets 120 and 130 are bonded together, and below core node 125, core sheet 120 becomes an unlayered portion and core sheet 130 becomes bonded to core sheet 140. Then at core node 126, core sheet 130 becomes an unlayered portion, and core sheet 140 becomes bonded to core sheet 150. When compared with FIG. 3 some similarities are observed: both structures employ selective bonding of the core sheets to each other and to the face sheets; both structures have layered core portions, the layered portions being about twice as thick as the unlayered portions, the layered portions running continuously between the two face sheets; the unlayered portions intersecting the layered portions and running between the two face sheets, thereby providing intermediate support to the face sheets and layered core; and where a face node joins layered portions to the face sheets, e.g., at 111, the opposite aligned face node joins an unlayered portion, i.e., at 152.

The seven sheet structure can be used to make a sandwich structure considerably thicker than the five sheet structure. It is estimated that the five sheet structure can make a stable sandwich up to about five inches thick. The seven sheet structure can similarly make a sandwich up to about ten inches in thickness. Of course, the thicker sandwich utilizes more metal and is heavier than the five sheet sandwich, but these disadvantages are offset for selected applications by the increase in strength.

Figure 8:
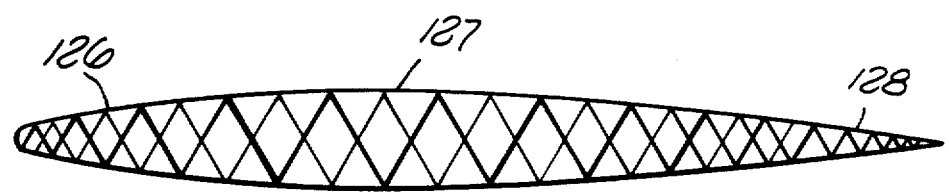
FIG. 8 illustrates a cross-sectional, elevational view of an airfoil having a substantial portion formed of five sheets.
Figure 9:
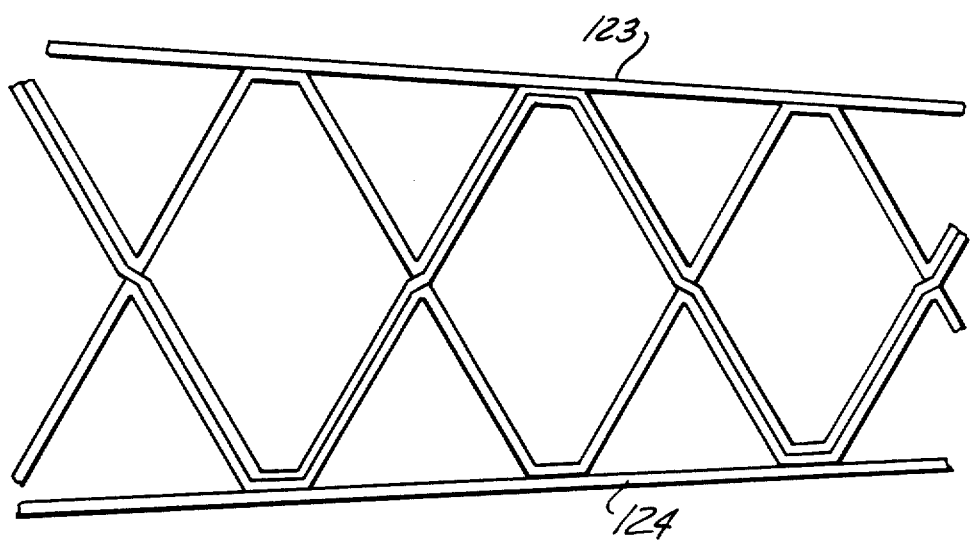
FIG. 9 illustrates a portion of the same view as shown in FIG. 8, where the airfoil is converging.

Referring to FIGS. 8 and 9, an airfoil structure is shown made from the five sheet structure. The leading edge 126 of the airfoil has diverging face sheets, the central portion 127 has converging face sheets 123 and 124, and the trailing edge 128 becomes so thin that the structure becomes a three sheet structure. With the three sheet portion, there is but one unlayered core sheet in the thin portion of the trailing edge.

Figure 10:
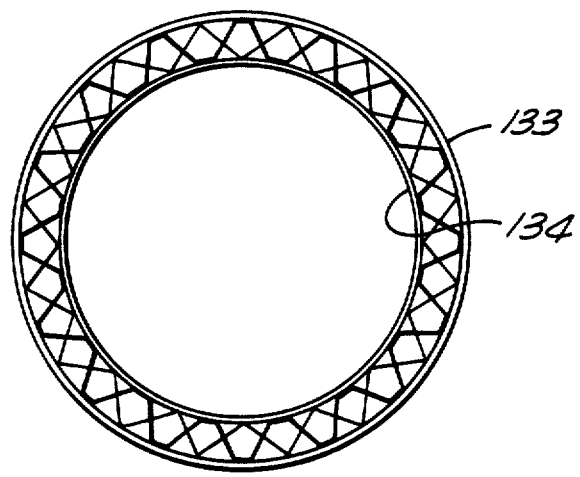
FIG. 10 illustrates a cross-sectional, elevational view of a sandwich structure having five sheets, wherein the face sheets are concentric circles.
Figure 11:
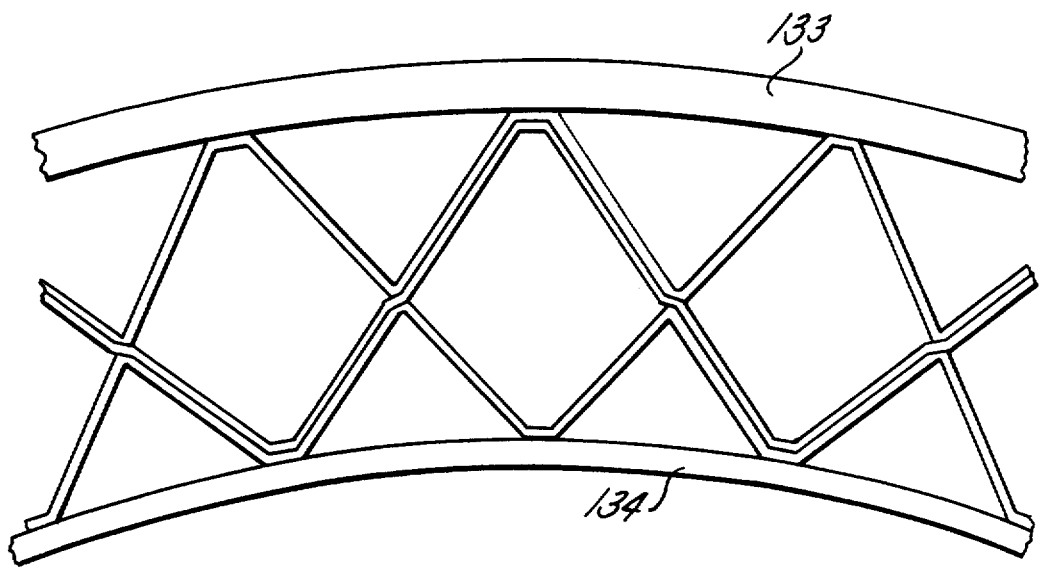
FIG. 11 illustrates an enlarged portion of the same elevational view shown in FIG. 10.

Referring to FIG. 10, a five sheet sandwich structure is shown where the face sheets 133 and 134 are concentric circles. FIG. 11, which is a section of FIG. 10, is similar to the sandwich structure shown in FIG. 3.

Accordingly, there has been provided a metallic sandwich structure having a partially layered core and a method for making the structure, that satisfies the objectives set forth above. It is understood that all terms used herein are descriptive rather than limiting. While the invention has been described in conjunction with specific embodiments, it is evident that many alternatives, modifications, and variations will be apparent to those skilled in the art in light of the disclosure herein. Accordingly, it is intended to include all such alternatives, modifications, and variations that fall within the spirit and scope of the appended claims.

I claim:

1. A metallic sandwich structure comprising:
   a first face sheet;
   a second face sheet spaced from said first face sheet;
   a first core sheet member positioned between said face sheets and metallurgically bonded at a plurality of first face nodes to said face sheets such that said first core sheet member extends transversely and linearly with substantially no eccentricity from one face sheet to the other in alternate sequence; and
   a second core sheet member positioned between said face sheets and metallurgically bonded at a plurality of second face nodes to said face sheets such that said second core sheet member extends transversely and linearly with substantially no eccentricity from one face sheet to the other in alternate sequence, said second face nodes positioned in alternate sequence along respective face sheets with said first face nodes, said second core sheet member being metallurgically bonded to said first core sheet member at a plurality of core nodes such that transverse support is provided to said first core sheet member.

2. The structure of claim 1 wherein opposite each first face node on either face sheet is aligned on the other face sheet a face second node.

3. The structure of claim 2 wherein said core nodes are positioned transversely relative to said face nodes.

4. The structure of claim 1 wherein said first core sheet member and said second core sheet member have substantially the same thickness.

5. The structure of claim 1 wherein said first core sheet member is substantially thicker than said second core sheet member.

6. The structure of claim 1 wherein said first core sheet member is layered and said second core sheet member is unlayered.

7. A metallic sandwich structure comprising:
   a first face sheet;
   a second face sheet spaced from said first face sheet;
   a first core sheet member positioned between said face sheets and metallurgically bonded at a plurality a first face nodes to said face sheets such that said first core sheet member extends transversely from one face sheet to the other in alternate sequence; and
   a second core sheet member positioned between said face sheets and metallurgically bonded at a plurality of second face nodes to said face sheets such that said second core sheet member extends transversely from one face sheet to the other in alternate sequence, said first core sheet member being substantially thicker than said second core sheet member, said second face nodes positioned between said first face nodes, said second core sheet member being metallurgically bonded to said first core sheet member at a plurality of core nodes such that transverse support is provided to said first core sheet member.

8. The structure of claim 7 wherein opposite each first face node on either face sheet is aligned on the other face sheet a second face node.

9. The structure of claim 8 wherein said core nodes are positioned transversely relative to said face nodes.

10. The structure of claim 7 wherein there is a plurality of second core sheet members.

11. The structure of claim 7 wherein said first core sheet member is layered and said second core sheet member is unlayered.

12. A metallic sandwich structure which comprises:
    two face sheets;
    a layered core portion which is positioned between and metallurigically bonded to both of said face sheets forming face nodes, said layered core portion continuously running between said face sheets and forming acute angles relative to said face sheets; and
    an unlayered core portion which is positioned between said face sheets and metallurgically bonded to said face sheets forming face nodes, said unlayered core portion continuously running between said face sheets forming acute angles relative to said face sheets, and contacting said layered core portion forming core nodes.

13. The sandwich structure of claim 12 wherein said layered core portion is formed from two metal sheets and said unlayered core portion is formed from one metal sheet.

14. The sandwich structure of claim 13 wherein said face nodes along each face sheet alternate between layered and unlayered portions.

15. The sandwich structure of claim 13 wherein the distance between said face sheets is in the range of 2¼ inches to 4¼ inches.

16. The sandwich structure of claim 12 wherein said acute angles between said core portion and said face sheets are in the range of 50 to 65 degrees.

17. The sandwich structure of claim 12 wherein there is either a layered portion or an unlayered portion between successive nodes.

18. The sandwich structure of claim 12 wherein opposite a face node in which a layered core portion contacts a face sheet, is aligned an opposing face node in which an unlayered core portion contacts said other face sheet.

19. The sandwich structure of claim 12 wherein said face sheets are substantially parallel.

20. The sandwich structure of claim 12 wherein said face sheets are positioned to be substantially concentric.

21. The sandwich structure of claim 12 wherein a portion of one of said face sheets forms an oblique angle relative to said other face sheet.

22. The sandwich structure of claim 12 wherein said unlayered core portions are substantially as thick as said layered core portions.

* * * * *